Feb. 13, 1940.　　　　E. W. AUSTIN　　　　2,190,347
EARTH MOVER
Filed March 27, 1939　　　2 Sheets-Sheet 2
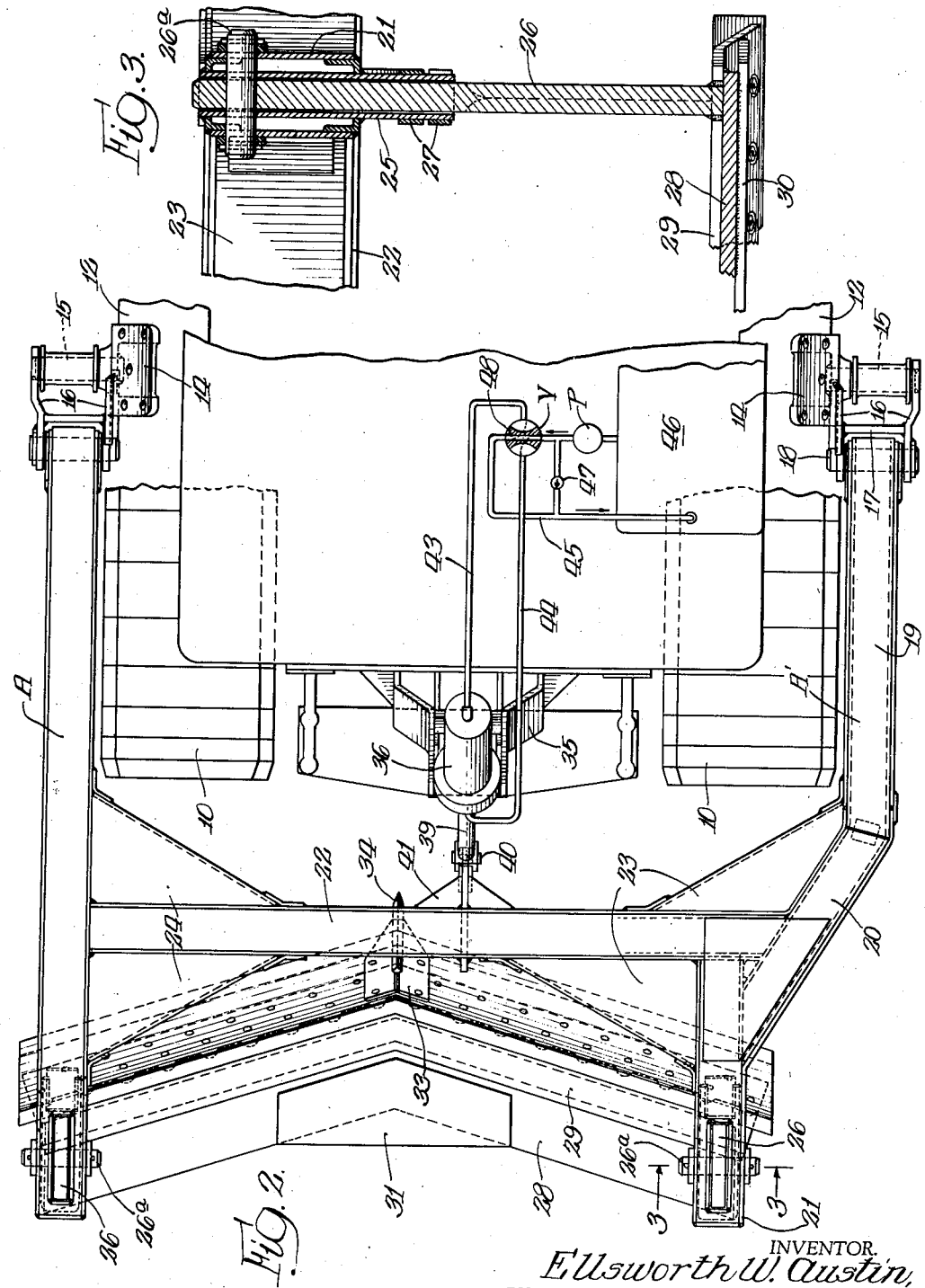
INVENTOR.
Ellsworth W. Austin,
BY Bair & Freeman
ATTORNEYS.

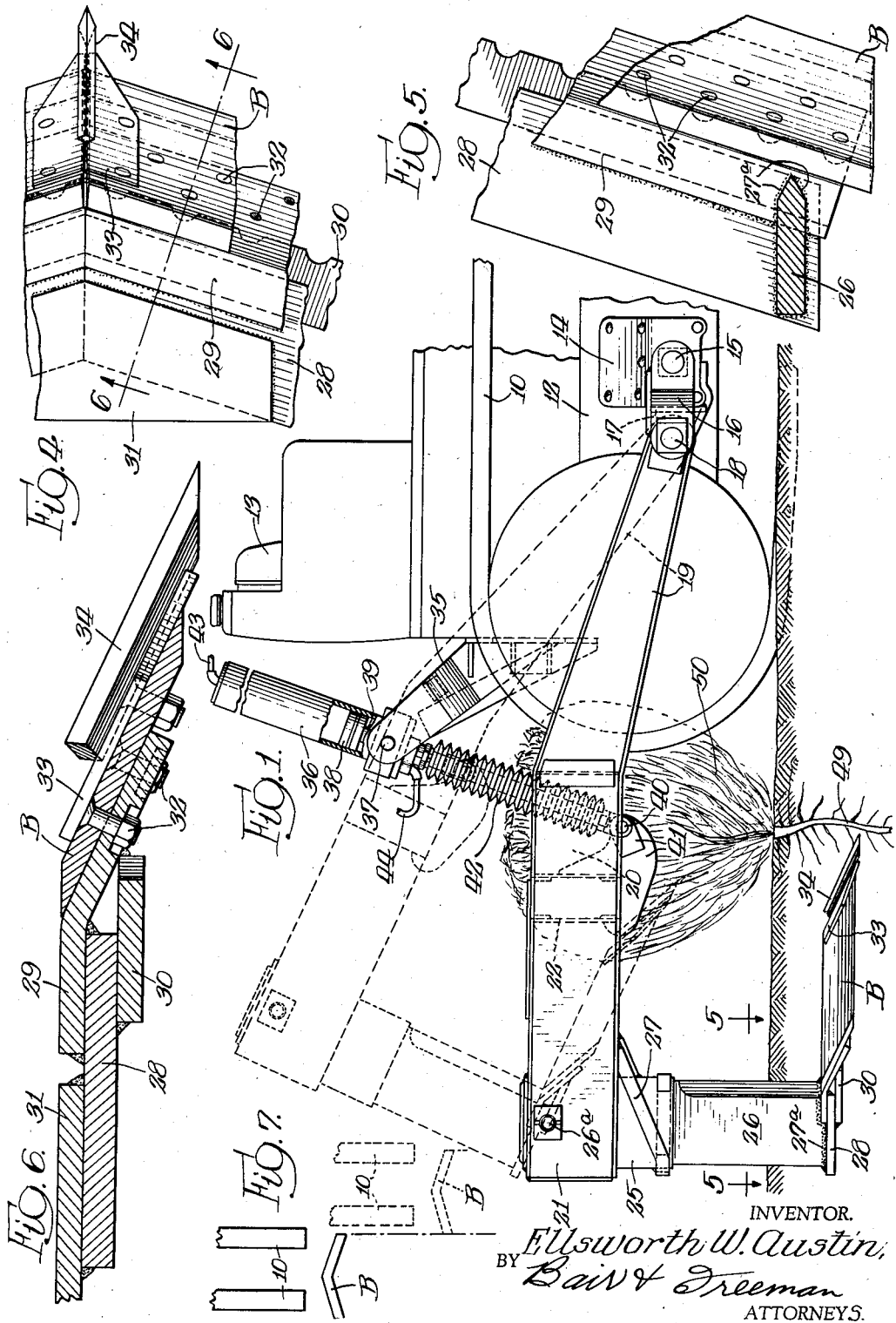

Patented Feb. 13, 1940

2,190,347

UNITED STATES PATENT OFFICE 2,190,347

EARTH MOVER

Ellsworth W. Austin, Cedar Rapids, Iowa, assignor to La Plant-Choate Manufacturing Co., Inc., Cedar Rapids, Iowa, a corporation of Delaware Application March 27, 1939, Serial No. 264,413

12 Claims. (Cl. 97—47)

An object of my present invention is to provide an earth mover particularly adapted as a root cutter for mesquite and other growth of a low, bushy nature that can be readily driven over with a tractor.

A further object is to provide the root cutter mounted on a tracklaying tractor and including a blade which can be submerged below the ground level and pulled by the tractor to effect cutting of the bush roots at a distance of eight or ten inches below the ground surface, my device being thereby effective as a means to kill out growths such as mesquite and the like, as the bush soon dries after the roots are thus cut and can be raked into piles and burned.

A further object is to provide a root cutter particularly adaptable as a means of cutting the roots at a distance below the ground surface without excessive disturbance of the ground itself, there being provided for this purpose a rigid framework connected wtih a tracklaying tractor and extending around the rear thereof, a pair of spaced posts being arranged to extend downwardly from the frame and having their front edges sharpened and being relatively wide in the direction of tractor travel and thin transversely thereof, a root cutter blade being arranged to span the distance between the lower ends of the post.

Another object is to provide the root cutter blade of relatively thin vertical dimensions and wide in a fore and aft direction so that it has plenty of resistance against undesired bending, yet may be passed readily through the ground below the surface thereof by movement of the tractor.

Still another object is to provide a readily operable means for regulating the depth of cut of the root cutting blade and to elevate it to an inoperative position for transportation when desired, such means including a hydraulic jack mechanism.

Another object is to provide a root cutting structure which can be readily backed into position for commencing operations adjacent fences and the like and which can be turned in close quarters, as it is entirely supported by the tractor and the cutter blade is arranged relatively close to the tractor.

Still another object is to provide the root cutting blade mounted at the rear of the tractor so that the tractor can travel over solid ground that has been undisturbed by the root cutting blade, the blade being offset relative to the tractor so that in completely working the surface of the ground the blade overhangs one edge of the tractor and subsequent passes of the tractor in parallel rows along the ground permits the tractor to travel on undisturbed ground.

With these and other objects in view, my invention consists in the construction, arrangement and combination of the various parts of my device whereby the objects contemplated are attained, as hereinafter more fully set forth, pointed out in my claims and illustrated in the accompanying drawings, in which:

Figure 1 is a side elevation of my earth mover showing the root cutting blade in submerged position below the surface of the ground and cooperating to cut the roots of a bush, the rear portion only of the tractor being shown;

Figure 2 is a plan view of my invention in which, again, only the rear portion of the tractor is shown;

Figure 3 is an enlarged vertical sectional view on the line 3—3 of Figure 2 showing the connection of a post of the structure to a supporting frame thereof;

Figure 4 is an enlarged plan view of the central portion of the root cutting blade of my structure;

Figure 5 is a plan view of the outer end of the blade illustrating a supporting post therefor in section as taken on the line 5—5 of Figure 1;

Figure 6 is an enlarged sectional view on the line 6—6 of Figure 4 to show details of construction of the root cutting blade, and Figure 7 is a diagrammatic view showing how my invention is used in actual practice.

On the accompanying drawings, I have used the reference numeral 10 to indicate the tracks of a tracklaying type of tractor and 12 the track frames thereof. The driver's seat of the tractor is shown at 13.

My invention includes a pair of brackets 14 secured to the track frames 12 and having supporting posts 15 extending therefrom. A pair of bracket plates 16 are welded to each supporting post and reenforced by a cross plate 17. The plates 16 support removable pivot pins 18.

Pivoted on the pins 18 are side arms A and A'. The arm A extends rearwardly and is substantially straight, as shown in Figure 2, while the arm A' is formed of three sections 19, 20 and 21. The section 20 is connected by a connecting element 22 to the arm A and suitable gussets 23 and 24 serve to reenforce the entire frame formed by the elements A, A' and 22. The entire frame construction is preferably formed of suitable channels and plates welded together to form substantially rectangular tubular elements of each member A, A' and 22.

The portion 21 of the arm A' and the rear end of the arm A are each provided with a substantially rectangular tube 25 extending vertically therethrough and forming an opening for a post 26. The tubes 25 are welded in position as shown in detail in Figure 3, and their lower ends project below the rear ends of the arms A and A' and are braced by bars 27 welded to them and to the arms.

Each post 26 is relatively wide in a fore and aft direction and thin transversely of the tractor and is also sharpened, as indicated at 27a, along its forward edge. Spanning the lower ends of the posts 26 is a root cutting blade B supported by a suitable supporting structure comprising a main plate 28, a blade supporting plate 29 and a brace plate 30 (see Figure 6). Each of the plates 28, 29 and 30 is V-shaped in plan view as shown in Figure 2, with its vertex forward or toward the tractor. The main plate is braced at its vertex by a plate 31 and the various plates 28, 29, 30 and 31 are all welded together. The supporting plate 29 extends downwardly and forwardly from the forward edge of the main plate 28, while the base plate 30 extends forwardly from the lower edge of the main plate and is welded at its forward edge to the lower surface of the supporting plate 29. This arrangement provides an effectively braced support for the blade B and the entire blade assembly is relatively thin in a vertical direction, yet has sufficient width in a horizontal direction to substantially withstand the strains of operation.

The blade B is secured to the supporting plate 29 as by countersunk bolts 32 and at its vertex a plate 33 is provided for supporting a tooth 34. The tooth 34 serves as an effective advance means to break the ground and permit the blade B to follow through in the root cutting operations, as shown in Figure 1.

For supporting the frame A, A', 22 at the desired inclination relative to the tractor and thereby supporting the blade B at the desired cutting depth, I provide a hydraulic jack mechanism J. The mechanism J includes a bracket 35 supported on the back of the tractor and a cylinder 36 pivoted at 37 thereto. Within the cylinder 36 is a piston 38, from which extends a piston rod 39. The lower end of the piston rod is pivoted as at 40 to a bracket 41 connected to the cross member 22. A bellows 42 is shown in Figure 1 for enclosing the piston rod against dirt coming in contact therewith and the bellows is omited from Figure 2.

Any desired hydraulic system can be provided for the jack J, one such system being shown diagrammatically in Figure 2 and including a pump P and a control valve V. The valve V is of the usual four-way type for supplying oil under pressure either to a pipe 43 or a pipe 44. The oil returns by way of the other pipe from the jack J and through the valve V to a return pipe 45. The oil is pumped from and returned to a reservoir 46. A pressure relief valve 47 serves to by-pass oil in excess of a certain pressure and the valve V is provided with a passageway 48 for relieving the pressure in the hydraulic system produced by operation of the pump P when the valve V is in the off position shown in Figure 2.

In the operation of my earthmover, the blade B can be adjusted to any desired depth of cut for the roots 49 of the bush 50 shown in Figure 1. This is accomplished by manipulating the valve V and turning it to the neutral position shown in Figure 2 when the desired depth of the blade has been secured. When transporting the device, it may be elevated to the dotted position of Figure 1.

As the tractor moves forwardly, the blade B cuts off the root 49 and the blade maintains a substantially level path of travel submerged beneath the surface of the ground as the tractor travels over the ground. The sharpened forward edges of the posts 26 permit the posts to be readily pulled through the ground with the blade B submerged, and the offsetting of the blade with respect to the tractor results in the possibility of operation in successive rows, as shown in Figure 7. The tracks 10 of the tractor and the blade B are shown diagrammatically in solid lines cutting one swath of bush. The next traverse of the tractor and blade is shown by dotted lines and it will be noted that due to the offset of the blade the tracks 10 may travel on undisturbed ground.

I have found my structure very effective as a means to quickly clear mesquite and other low, bushy growth from land that can be used for grazing and other purposes. It is a comparatively easy matter to maintain the blade at an even depth in the ground even though the surface is uneven and full of growths and depressions, as a tracklaying tractor rides fairly level over the bumps. Also, a tracklaying tractor has sufficient traction to advance the blade and cut the roots as the tractor advances across the ground. Since the structure may be mounted on the tractor, it can be made comparatively inexpensively as distinguished from types of devices that require carriages to support them while being drawn behind the tractor.

The operator sits immediately ahead of the cutter blade and has a clear view of the cutting operation, so that he can tell whether the bush is being torn up by its roots or cleanly cut. The blade may be readily detached from the tractor by running the blade into the ground to support the frame and then removing the pivot pins 18 and driving the tractor away. When it is desirable to again use the blade it is merely necessary to back the tractor into position and reinsert the pins 18. The blade and post assembly may be disconnected from the frame and a different type of blade substituted if desired. This is readily accomplished by removal of pins 26a which serve to connect the posts 26 in the tubular sockets 25. The connection at this point also facilitates removal of the blade for repair or renewal if desired.

I have also found that my particular arrangement of frame and blade do not tend to tip the tractor over in the event that there is some obstruction in the ground tending to raise or lower one end of the blade when the tractor is turning. Since the tractor is relatively heavy and the frame is rigidly connected thereto such tendency of the blade is directed to the tractor but the weight of the tractor effectively overcomes any possibility of the blade tipping the tractor over.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:
1. In an earth moving device, a tractor, a U-shaped frame adapted for attachment of its arms to said tractor, a root cutting blade supported by said frame at the rear of said tractor for root cutting operations upon being propelled by said tractor, said blades comprising forwardly converging blade portions which are relatively thin vertically and wide horizontally and being arranged to be propelled by said tractor, vertex foremost, and at an elevation to cut under ground, uprights rigidly attached to said blade at points near the lower extremities of said legs, means for attaching said uprights to said frame, and a hydraulic jack interposed between said tractor and said frame for varying such elevation and thereby adjusting the depth of cut.

2. In an earth moving device, a tractor, a U-shaped frame adapted for attachment to said tractor, a plurality of spaced ground engaging standards arranged at the rear thereof, a V-shaped root cutting blade integral with said standards, said V-shaped blade being adapted for passing beneath the surface of the ground for root cutting operations and comprising forwardly converging main plate members, inverted V-shaped supporting plate members solidly welded to the forward and upper portions of said main plates, bottom reinforcing plates welded to said main plates and arranged to brace the lower edges of said supporting plates, cutting edges bolted to the supporting plates to resist abrasion and hydraulic jack mechanism interposed between said tractor and said frame for vertically adjusting said frame relative to said tractor.

3. In an earth moving device, a tractor, a frame adapted for attachment to said tractor, a pair of spaced ground engaging standards extending downwardly therefrom, a root cutting blade integral with said standards, said blade being adapted for passing beneath the surface of the ground for root cutting operations and comprising a main plate member, an inverted V-shaped supporting plate member rigidly welded to the forward and upper portion of said main plate member, a bottom reinforcing plate welded to said main plate member and to said supporting plate member and means for vertically adjusting said frame relative to said tractor.

4. In an earth moving device, a tracklaying tractor, an H-shaped frame adapted for attachment of two of its arms to said tractor, a pair of posts depending from the other two arms thereof, a root cutting blade supported by the lower ends of said posts at the rear of said tractor for root cutting operations upon being propelled by said tractor and a hydraulic jack interposed between said tractor and said frame for varying the elevation of said blade and thereby adjusting the depth of cut thereof.

5. In an earthmover, a tracklaying tractor, an arm pivoted to each side thereof and extending rearwardly therefrom, each of said arms having a vertically arranged opening therein adjacent the rear end thereof, a connector element spanning the distance between said arms and effecting rigid connection of said arms together to form a supporting frame, hydraulic jack means to elevate said frame to different inclinations relative to said tractor, a post in each of said vertically arranged openings, a pin extending through each of said arms to retain said posts in said openings, each of said posts being relatively wide in the direction of travel of the tractor and relatively thin transversely of said direction and being sharpened along its forward edge, and a blade secured to the lower ends of said posts and spanning the distance between them, said blade being V-shaped in plan view with its vertex toward the tractor, said posts being located relative to the tractor with one of them within the extended line of one side of the tractor and the other outside the extended line of the other side of the tractor.

6. In an earthmover, a tracklaying tractor, an arm pivoted to each side thereof and extending rearwardly therefrom, a connector element spanning the distance between said arms and effecting rigid connection of said arms together to form a supporting frame, means to elevate said frame to different inclinations relative to said tractor, a post depending from each of said arms, and a blade secured to the lower ends of said posts and spanning the distance between them, said blade being V-shaped in plan view with its vertex toward the tractor.

7. In an earthmover, a tractor, an arm attached to each side thereof and extending rearwardly therefrom, a connector element spanning the distance between said arms and effecting rigid connection of said arms together to form a supporting frame, a post depending from each of said arms, each of said posts being relatively wide in the direction of travel of the tractor and relatively thin transversely of said direction and a blade secured to the lower ends of said posts and spanning the distance between them.

8. In an earthmover, a tracklaying tractor, an arm extending rearwardly from each side thereof, means for rigidly connecting said arms together to form a supporting frame, a post extending downwardly from the rear end of each of said arms, each of said posts being sharpened along its forward edge, and a blade secured to the lower ends of said posts and spanning the distance between them.

9. In an earthmover, a tractor, an arm pivoted to each side thereof and extending rearwardly therefrom, means to elevate said frame to different inclinations relative to said tractor, a post depending from each of said arms, and a blade secured to the lower ends of said posts and spanning the distance between them, said blade being relatively wide horizontally and relatively thin vertically to facilitate movement thereof through the earth during root cutting operations.

10. In an earthmover, a tractor, a frame comprising one relatively straight side arm along one side of the tractor and extending rearwardly therefrom, a second side arm along the other side of the tractor and extending rearwardly therefrom, the rearwardly extending end of said second side arm being offset to a position behind the tractor, a connecting element between said side arms and located behind the tractor, posts extending downwardly from the rear ends of said side arms and a root cutting blade spanning the distance between the lower end of said posts.

11. In an earthmover, a tractor, a frame comprising one relatively straight side arm along one side of the tractor and extending rearwardly therefrom, a second side arm along the other side of the tractor and extending rearwardly therefrom, the rearwardly extending end of one of said side arms being offset to a position behind the tractor, means for rigidly connecting said side arms together, posts extending downwardly from the rear ends of said side arms and a V-shaped root cutting blade spanning the distance between the lower ends of said posts and having its vertex toward the tractor and a tooth mounted on the vertex.

12. In an earthmover, a tractor, a frame supported thereby and extending around the rear end thereof, posts extending downwardly from said frame and a blade carried by said posts and comprising a main plate welded to the lower ends of the posts, a blade supporting plate welded to the top of the main plate and extending forwardly and downwardly therefrom, a base plate welded to the bottom of said main plate and extending forwardly therefrom, the forward edge of said base plate being welded to the bottom of said blade supporting plate, and a cutting blade supported on said blade supporting plate.

ELLSWORTH W. AUSTIN.